US011059486B2

(12) United States Patent
Kato et al.

(10) Patent No.: US 11,059,486 B2
(45) Date of Patent: Jul. 13, 2021

(54) VEHICLE CONTROL UNIT, VEHICLE, AND VEHICLE CONTROL METHOD

(71) Applicant: HONDA MOTOR CO., LTD., Tokyo (JP)

(72) Inventors: Daichi Kato, Wako (JP); Tadahiko Kanoh, Wako (JP); Kanta Tsuji, Wako (JP); Atsushi Ishioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/796,427

(22) Filed: Feb. 20, 2020

(65) Prior Publication Data

US 2020/0269842 A1    Aug. 27, 2020

(30) Foreign Application Priority Data

Feb. 22, 2019    (JP) .............................. JP2019-030356

(51) Int. Cl.
*B60W 30/18*    (2012.01)
*B60W 50/02*    (2012.01)
*B60W 50/00*    (2006.01)

(52) U.S. Cl.
CPC ...... *B60W 30/18163* (2013.01); *B60W 50/02* (2013.01); *B60W 2050/0089* (2013.01); *B60W 2556/10* (2020.02)

(58) Field of Classification Search
CPC .......... B60W 30/18163; B60W 50/02; B60W 2556/10; B60W 2050/0089; B60Q 1/34
See application file for complete search history.

(56) References Cited

U.S. PATENT DOCUMENTS

| 10,311,749 B1* | 6/2019 | Kypri ..................... G06Q 40/00 |
| 2019/0084572 A1 | 3/2019 | Oishi et al. |
| 2020/0079393 A1* | 3/2020 | Hasegawa ............ G05D 1/0061 |

FOREIGN PATENT DOCUMENTS

JP    2017-178068 A    10/2017

* cited by examiner

*Primary Examiner* — Jeff A Burke
*Assistant Examiner* — Jamal A Shah
(74) *Attorney, Agent, or Firm* — Carrier Blackman & Associates, P.C.; Joseph P. Carrier; Jeffrey T. Gedeon

(57) ABSTRACT

A vehicle control unit includes: a lane change control unit that performs lane change control in which a host vehicle changes lanes on the basis of a surrounding situation of the host vehicle; and a lane change control suppression unit that allows the lane change control in a case where there is no operation history indicating that an operation of a notification unit for notifying a direction to which a traveling direction of the host vehicle is changed is not normal, and suppresses the lane change control in a case where the operation history indicating that the operation of the notification unit is not normal is present.

2 Claims, 7 Drawing Sheets

VEHICLE CONTROL UNIT, VEHICLE, AND VEHICLE CONTROL METHOD

CROSS-REFERENCE TO RELATED APPLICATION

This application is based upon and claims the benefit of priority from Japanese Patent Application No. 2019-030356 filed on Feb. 22, 2019, the contents of which are incorporated herein by reference.

BACKGROUND OF THE INVENTION

Field of the Invention

The present invention relates to a vehicle control unit that performs lane change control in which a host vehicle changes lanes, a vehicle including the vehicle control unit, and a vehicle control method for performing the lane change control in which the host vehicle changes lanes.

Description of the Related Art

Japanese Laid-Open Patent Publication No. 2017-178068 discloses a travel assistance device that, upon reception of an instruction of a first lane change from a direction indication switch, controls the lane change in accordance with the instruction of the first lane change and turns on a direction indicator in a traveling direction expressing the first lane change.

SUMMARY OF THE INVENTION

In the technique disclosed in Japanese Laid-Open Patent Publication No. 2017-178068, however, if the direction indicator (notification unit) is not normal and cannot blink (turn on) the direction indicator, the lane change may be performed in a state where the direction indicator does not blink.

The present invention has been made in order to solve the above problem, and an object is to provide a vehicle control unit, a vehicle, and a vehicle control method that enable a host vehicle to travel safely even in a case where an operation of a notification unit that notifies a direction to which the traveling direction of the host vehicle will be changed is not normal.

A first aspect of the present invention is a vehicle control unit including: a surrounding situation acquisition unit configured to acquire a surrounding situation of a host vehicle; a lane change control unit configured to perform lane change control in which the host vehicle changes lanes on a basis of the surrounding situation; and a lane change control suppression unit configured to allow the lane change control in a case where there is no operation history indicating that an operation of a notification unit configured to notify a direction to which a traveling direction of the host vehicle is changed is not normal, and suppress the lane change control in a case where the operation history indicating that the operation of the notification unit is not normal is present.

A second aspect of the present invention is a vehicle control unit including: a surrounding situation acquisition unit configured to acquire a surrounding situation of a host vehicle; a lane change control unit configured to perform lane change control in which the host vehicle changes lanes on the basis of the surrounding situation; and a lane change control suppression unit configured to allow the lane change control in a case where there is no operation history indicating that an operation of a notification unit configured to notify a direction to which a traveling direction of the host vehicle is changed is abnormal, and suppress the lane change control in a case where the operation history indicating that the operation of the notification unit is abnormal is present.

A third aspect of the present invention is a vehicle including the vehicle control unit according to the first or second aspect.

A fourth aspect of the present invention is a vehicle control method including: a lane change control suppressing step of allowing lane change control in a case where there is no operation history indicating that an operation of a notification unit configured to notify a direction to which a traveling direction of a host vehicle is changed is not normal, and suppressing the lane change control in a case where the operation history indicating that the operation of the notification unit is not normal is present; a surrounding situation monitoring step of monitoring a surrounding situation of the host vehicle; and a lane change controlling step of performing the lane change control in which the host vehicle change lanes on the basis of the surrounding situation.

Even in the case where the operation of the notification unit for notifying the direction to which the traveling direction of the host vehicle is changed is not normal, the host vehicle can travel safely.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Vehicle]

Figure 1:
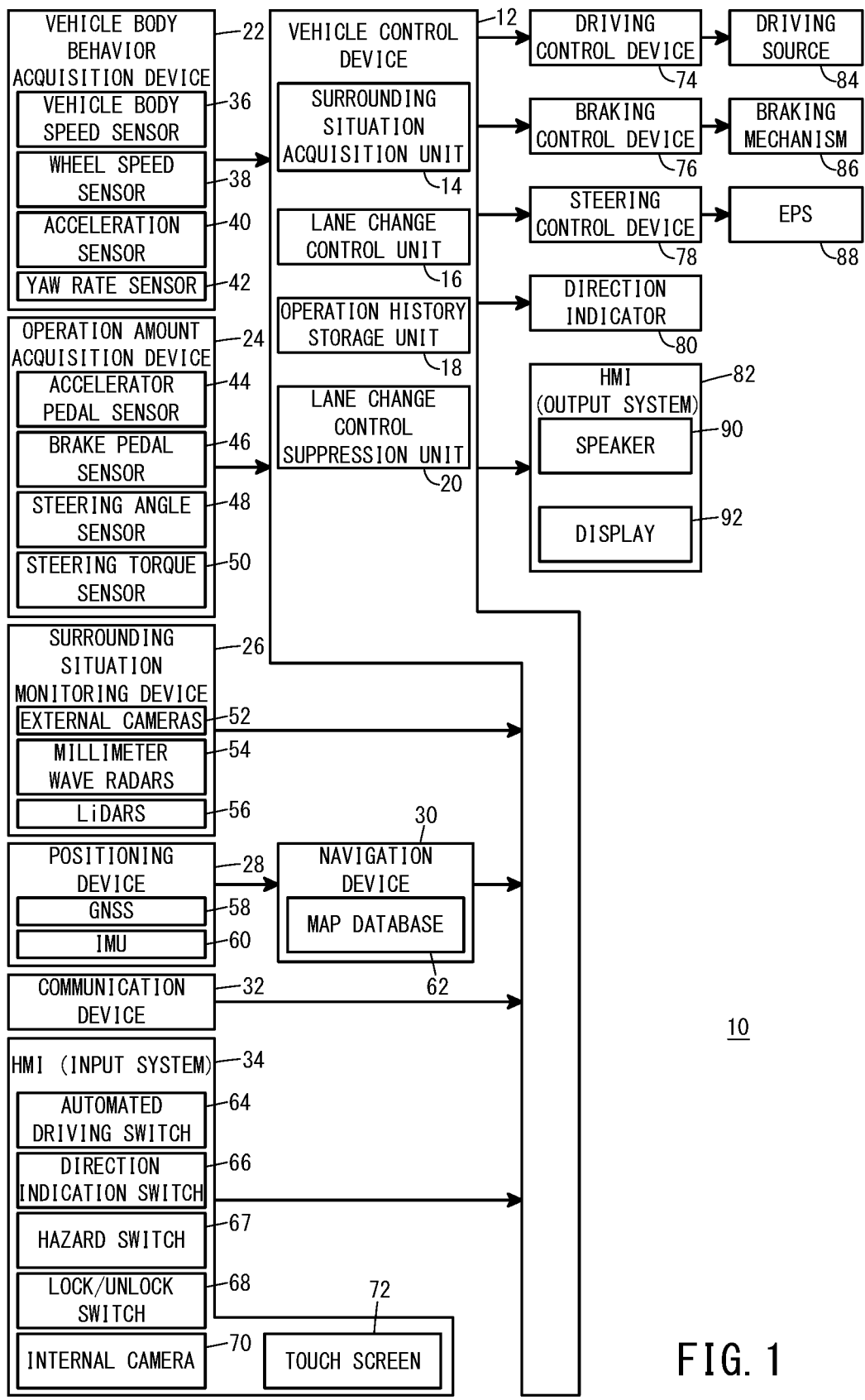
FIG. 1 is a block diagram illustrating a configuration of a vehicle.

FIG. 1 is a block diagram illustrating a configuration of a vehicle 10 according to a first embodiment. The vehicle 10 according to the present embodiment includes a vehicle control unit 12. The vehicle control unit 12 includes a surrounding situation acquisition unit 14, a lane change control unit 16, an operation history storage unit 18, and a lane change control suppression unit 20.

The surrounding situation acquisition unit 14 acquires a surrounding situation of the vehicle 10 from a surrounding situation monitoring device 26 to be described below. The lane change control unit 16 performs the lane change control in which the vehicle 10 (hereinafter, also referred to as host vehicle 10) changes lanes on the basis of the acquired surrounding situation.

The operation history storage unit 18 stores an operation history indicating that an operation of a direction indicator 80 to be described below is normal or not normal when the direction indicator 80 is operated. Note that the operation history storage unit 18 may store the operation history indicating that the operation of the direction indicator 80 to be described below is abnormal or not abnormal when the direction indicator 80 is operated. In the description below, if the operation of the direction indicator 80 is normal, it means that the operation of the direction indicator 80 is not abnormal, and if the operation of the direction indicator 80 is not normal, it means that the operation of the direction indicator 80 is abnormal.

The lane change control suppression unit 20 causes the lane change control unit 16 to perform the lane change control when the operation history storage unit 18 does not store the operation history indicating that the operation of the direction indicator 80 is not normal. The lane change control suppression unit 20 causes the lane change control unit 16 to suppress the lane change control when the operation history storage unit 18 stores the operation history indicating that the operation of the direction indicator 80 is not normal.

The surrounding situation acquisition unit 14, the lane change control unit 16, and the lane change control suppression unit 20 are achieved when a computer executes programs stored in a storage medium that is not illustrated.

The lane change control unit 16, the operation history storage unit 18, and the lane change control suppression unit 20 are described below in detail.

As input devices that input various pieces of information to the vehicle control unit 12, the vehicle 10 includes a vehicle body behavior acquisition device 22, an operation amount acquisition device 24, the surrounding situation monitoring device 26, a positioning device 28, a navigation device 30, a communication device 32, and an input system human machine interface (hereinafter, HMI) 34.

The vehicle body behavior acquisition device 22 acquires vehicle body behavior information of the vehicle 10. As the vehicle body behavior acquisition device 22, the vehicle 10 includes a vehicle body speed sensor 36 that acquires vehicle body speed, a wheel speed sensor 38 that acquires wheel speed, an acceleration sensor 40 that acquires a front-rear acceleration, a lateral acceleration, and an up-down acceleration of the vehicle 10, and a yaw rate sensor 42 that acquires a yaw rate of the vehicle 10.

The operation amount acquisition device 24 acquires operation amount information of user's driving operation. As the operation amount acquisition device 24, the vehicle 10 includes an accelerator pedal sensor 44 that acquires the operation amount of an accelerator pedal, a brake pedal sensor 46 that acquires the operation amount of a brake pedal, a steering angle sensor 48 that acquires the steering angle of a steering wheel, and a steering torque sensor 50 that acquires the steering torque that is applied to the steering wheel.

The surrounding situation monitoring device 26 monitors the surrounding situation of the host vehicle 10. The surrounding situation refers to a situation of other vehicles, buildings, marks, and lanes around the host vehicle 10, for example. As the surrounding situation monitoring device 26, the vehicle 10 includes a plurality of external cameras 52 that photograph the outside of the vehicle 10, a plurality of millimeter wave radars 54 that acquire the distance between a detected object and the vehicle 10 by using millimeter waves, and a plurality of laser radars (LiDARs) 56 that acquire the distance between the detected object and the vehicle 10 by using laser light (infrared radiation), for example.

The positioning device 28 acquires positional information of the host vehicle 10. As the positioning device 28, the vehicle 10 includes a global navigation satellite system (GNSS) 58 that measures the position of the vehicle 10 by using a signal output from an artificial satellite, and an inertial measurement unit (IMU) 60 that acquires three-dimensional behavior of the vehicle 10 by using a triaxial gyroscope and an acceleration sensor in three directions.

The navigation device 30 causes a display 92 to be described below to display a map that is created based on a map database 62 and, on this map, the positional information of the vehicle 10 that is acquired by the positioning device 28 is displayed. Moreover, when the user operates a touch screen 72 to be described below so as to set a destination of the vehicle 10, the navigation device 30 sets a target route from the current position to the destination. On the basis of the set target route, the display 92 displays route guidance and a speaker 90 to be descried below outputs the route guidance voice. The information of the map database 62 and the target route information that is set by the navigation device 30 are input to the vehicle control unit 12.

The communication device 32 performs wireless communication with an external equipment (not shown). Examples of the external equipment include an external server. The communication device 32 may be provided to the vehicle 10 dedicatedly, for example, like a telematics control unit (TCU). Alternatively, a mobile phone, a smart phone, or the like may be used as the communication device 32.

When the user operates the input system HMI 34, the input system HMI 34 transmits a predetermined signal to the vehicle control unit 12. As the input system HMI 34, the vehicle 10 according to the present embodiment includes an automated driving switch 64, a direction indication switch 66, a hazard switch 67, a lock/unlock switch 68, an internal camera 70, and the touch screen 72.

The automated driving switch 64 is a switch for the user to instruct start (turn on) or stop (turn off) automated driving control.

The direction indication switch 66 is a switch that is operated by the user and used to set direction indicators 80, which are described below, to a state where a left direction indicator 80 blinks, a state where a right direction indicator 80 blinks, or a state where the blink of the direction indicators 80 is stopped. Note that if the automated driving control is on, when the user operates the direction indication switch 66, the direction indication switch 66 is also used as a switch to select the direction where the lane change will be automatically performed.

The hazard switch 67 is a switch that is operated by a user and used to blink both the direction indicators 80 or stop the blinking of the direction indicators 80.

The lock/unlock switch 68 is a switch that is operated by a user and used to lock or unlock a door of the vehicle 10. The lock/unlock switch 68 is used in what is called a keyless entry system or a smart entry system and may be provided to a smart key or provided to a vehicle body of the vehicle 10. The internal camera 70 is a camera that photographs the inside of a vehicle compartment of the vehicle 10.

The touch screen 72 is a transparent member with a film shape, and is stuck on a screen of the display 92 to be described below. The touch screen 72 acquires information about an operation position which the finger of the user, a stylus, or the like touches. An instruction of the user is input to the vehicle control unit 12 on the basis of the relation between the information about the operation position that is acquired by the touch screen 72 and a display position of an icon or the like that is displayed on the display 92.

As an output device to which an instruction signal from the vehicle control unit 12 is output, the vehicle 10 includes a driving control unit 74, a braking control unit 76, a steering control unit 78, the direction indicator 80, and an output system HMI 82.

The driving control unit 74 controls driving torque that is output from a driving source 84. The driving source 84 is one of or both an engine and a traction motor. If the automated driving control is off, the driving control unit 74 controls the driving torque of the driving source 84 on the basis of the operation amount of the accelerator pedal by the user. If the automated driving control is on, the driving control unit 74 controls the driving torque of the driving source 84 on the basis of the instruction from the vehicle control unit 12.

The braking control unit 76 controls braking torque of a braking mechanism 86. The braking mechanism 86 is a friction brake or both the friction brake and a regeneration brake. If the automated driving control is off, the braking control unit 76 controls the braking torque on the basis of the operation amount of the brake pedal by the user. If the automated driving control is on, the braking control unit 76 controls the braking torque on the basis of the instruction from the vehicle control unit 12.

The steering control unit 78 controls an electric power steering (hereinafter, referred to as EPS) 88 so as to control the steering angle and steering reaction force of the steering wheel, and the turning angle of steered wheels. If the automated driving control is off, the steering control unit 78 controls the steering reaction force of the steering wheel and the turning angle of the steered wheels in accordance with the steering angle of the steering wheel by the user. If the automated driving control is on, the steering control unit 78 controls the steering angle and the steering reaction force of the steering wheel and the turning angle of the steered wheels in accordance with the instruction from the vehicle control unit 12. Note that instead of the EPS 88, a hydraulic power steering may be used.

The direction indicators 80 are provided to left and right sides of the exterior of the vehicle 10, and one of the left and right direction indicators 80 blinks on the basis of the user's operation for the direction indication switch 66. In addition, both the left and right direction indicators 80 blink on the basis of the user's operation for the hazard switch 67. Moreover, when the door of the vehicle 10 is locked or unlocked on the basis of the user's operation for the lock/unlock switch 68, both the direction indicators 80 blink to notify the user that the door of the vehicle 10 is locked or unlocked (answer back function). Another example of the direction indicator 80 is the direction indicator 80 that is provided in the compartment of the vehicle 10 (for example, on an instrument panel). This direction indicator 80 works together with the direction indicator 80 provided to the exterior of the vehicle 10 so as to blink. The direction indicator 80 forms a notification unit.

The output system HMI 82 performs provision or notification of information to the user by an image or a sound. As the HMI 82, the vehicle 10 according to the present embodiment includes the speaker 90 and the display 92. The speaker 90 performs the provision or the notification of the information to the user by the sound. The display 92 performs the provision or the notification of the information to the user by the image.

[Operation History Storing Process]

Figure 2:
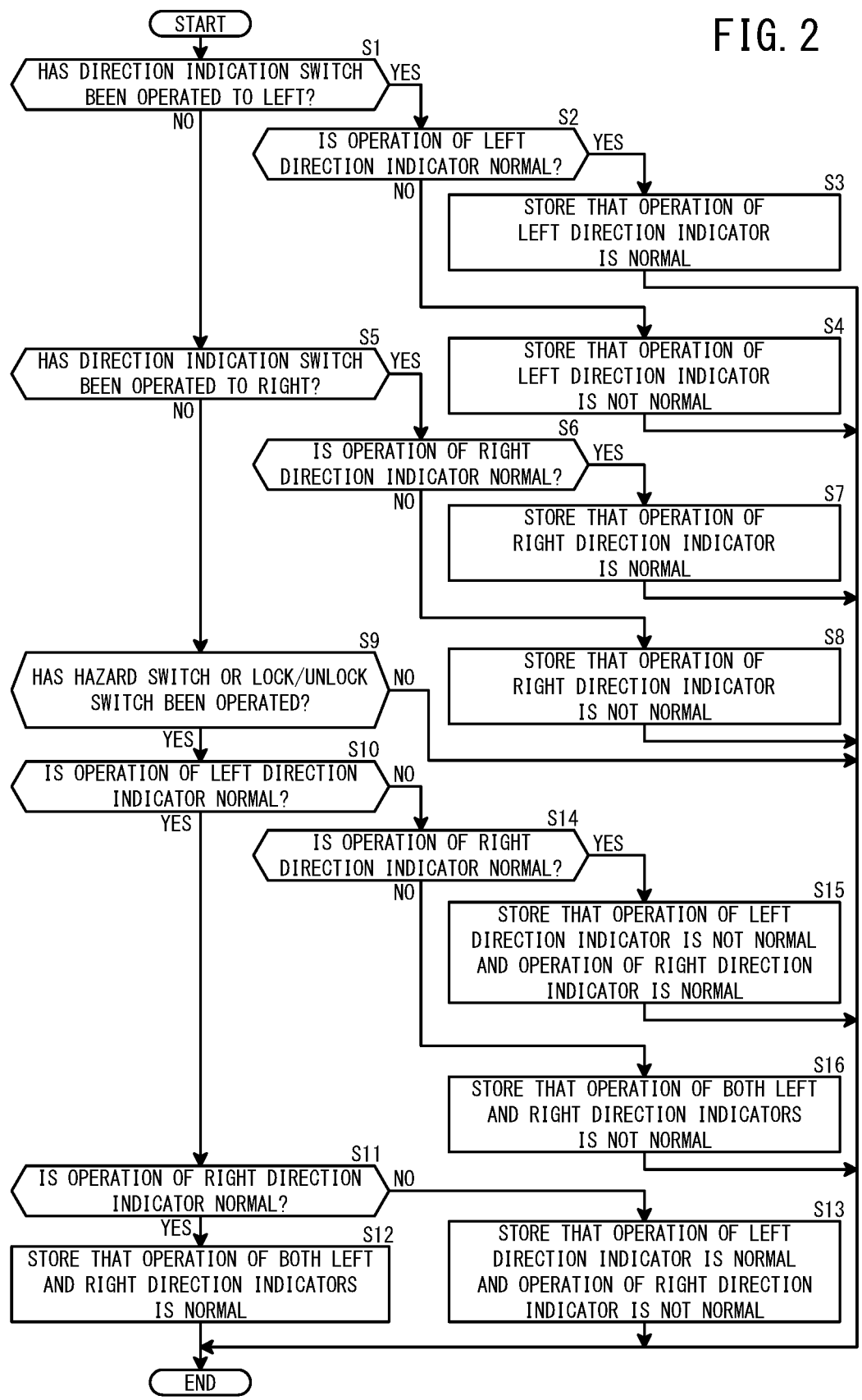
FIG. 2 is a flowchart illustrating an operation history storing process to be performed in a vehicle control unit.

FIG. 2 is a flowchart illustrating an operation history storing process to be performed in the vehicle control unit 12 according to the present embodiment. The operation history storing process is performed on a predetermined cycle regardless of whether the vehicle 10 is in operation.

In step S1, the vehicle control unit 12 determines whether the user has operated the direction indication switch 66 to the left. If the user has operated the direction indication switch 66 to the left, the process advances to step S2 and if the user has not operated the direction indication switch 66 to the left, the process advances to step S5.

In step S2, the vehicle control unit 12 determines whether the operation of the left direction indicator 80 is normal. If the operation of the left direction indicator 80 is normal, the process advances to step S3, and if the operation of the left direction indicator 80 is not normal, the process advances to step S4. The state in which the operation of the left direction indicator 80 is not normal corresponds to the state in which, for example, a plurality of left direction indicators 80 do not blink partially or entirely. Alternatively, the state in which the operation of the left direction indicator 80 is not normal may correspond to the state in which the partial or entire blinking of the left direction indicators 80 is undetectable.

In step S3, the vehicle control unit 12 stores, in the operation history storage unit 18, the operation history indicating that the operation of the left direction indicator 80 is normal.

In step S4, the vehicle control unit 12 stores, in the operation history storage unit 18, the operation history indicating that the operation of the left direction indicator 80 is not normal.

In step S5, the vehicle control unit 12 determines whether the user has operated the direction indication switch 66 to the right. If the user has operated the direction indication switch 66 to the right, the process advances to step S6 and if the user has not operated the direction indication switch 66 to the right, the process advances to step S9.

In step S6, the vehicle control unit 12 determines whether the operation of the right direction indicator 80 is normal. If the operation of the right direction indicator 80 is normal, the process advances to step S7, and if the operation of the right direction indicator 80 is not normal, the process advances to step S8. The state in which the operation of the right direction indicator 80 is not normal corresponds to the state in which, for example, a plurality of right direction indicators 80 do not blink partially or entirely. Alternatively, the state in which the operation of the right direction indicator 80 is not normal may correspond to the state in which the partial or entire blinking of the right direction indicators 80 is undetectable.

In step S7, the vehicle control unit 12 stores, in the operation history storage unit 18, the operation history indicating that the operation of the right direction indicator 80 is normal.

In step S8, the vehicle control unit 12 stores, in the operation history storage unit 18, the operation history indicating that the operation of the right direction indicator 80 is not normal.

In step S9, the vehicle control unit 12 determines whether the user has operated the hazard switch 67 or the lock/unlock switch 68. If the user has operated the hazard switch 67 or the lock/unlock switch 68, the process advances to step S10 and if the user has not operated the hazard switch 67 or the lock/unlock switch 68, the operation storing process ends.

In step S10, the vehicle control unit 12 determines whether the operation of the left direction indicator 80 is normal. If the operation of the left direction indicator 80 is normal, the process advances to step S11, and if the operation of the left direction indicator 80 is not normal, the process advances to step S14.

In step S11, the vehicle control unit 12 determines whether the operation of the right direction indicator 80 is normal. If the operation of the right direction indicator 80 is normal, the process advances to step S12 and if the operation of the right direction indicator 80 is not normal, the process advances to step S13.

In step S12, the vehicle control unit 12 stores, in the operation history storage unit 18, the operation history indicating that the operation of the left direction indicator 80 and the operation of the right direction indicator 80 are normal and then, the operation storing process ends.

In step S13, the vehicle control unit 12 stores, in the operation history storage unit 18, the operation history indicating that the operation of the left direction indicator 80 is normal and the operation of the right direction indicator 80 is not normal and then, the operation storing process ends.

In step S14, the vehicle control unit 12 determines whether the operation of the right direction indicator 80 is normal. If the operation of the right direction indicator 80 is normal, the process advances to step S15, and if the operation of the right direction indicator 80 is not normal, the process advances to step S16.

In step S15, the vehicle control unit 12 stores, in the operation history storage unit 18, the operation history indicating that the operation of the left direction indicator 80 is not normal and the operation of the right direction indicator 80 is normal, and then the operation storing process ends.

In step S16, the vehicle control unit 12 stores, in the operation history storage unit 18, the operation history indicating that the operation of the left direction indicator 80 and the operation of the right direction indicator 80 are not normal and then, the operation storing process ends.

Note that the vehicle control unit 12 may delete the operation history from the operation history storage unit 18 after a predetermined time, or may delete the operation history from the operation history storage unit 18 when the vehicle 10 is shut down. Alternatively, the vehicle control unit 12 may delete the operation history from the operation history storage unit 18 when the direction indicator 80 is exchanged, for example.

[Lane Change Control Suppressing Process]

Figure 3:
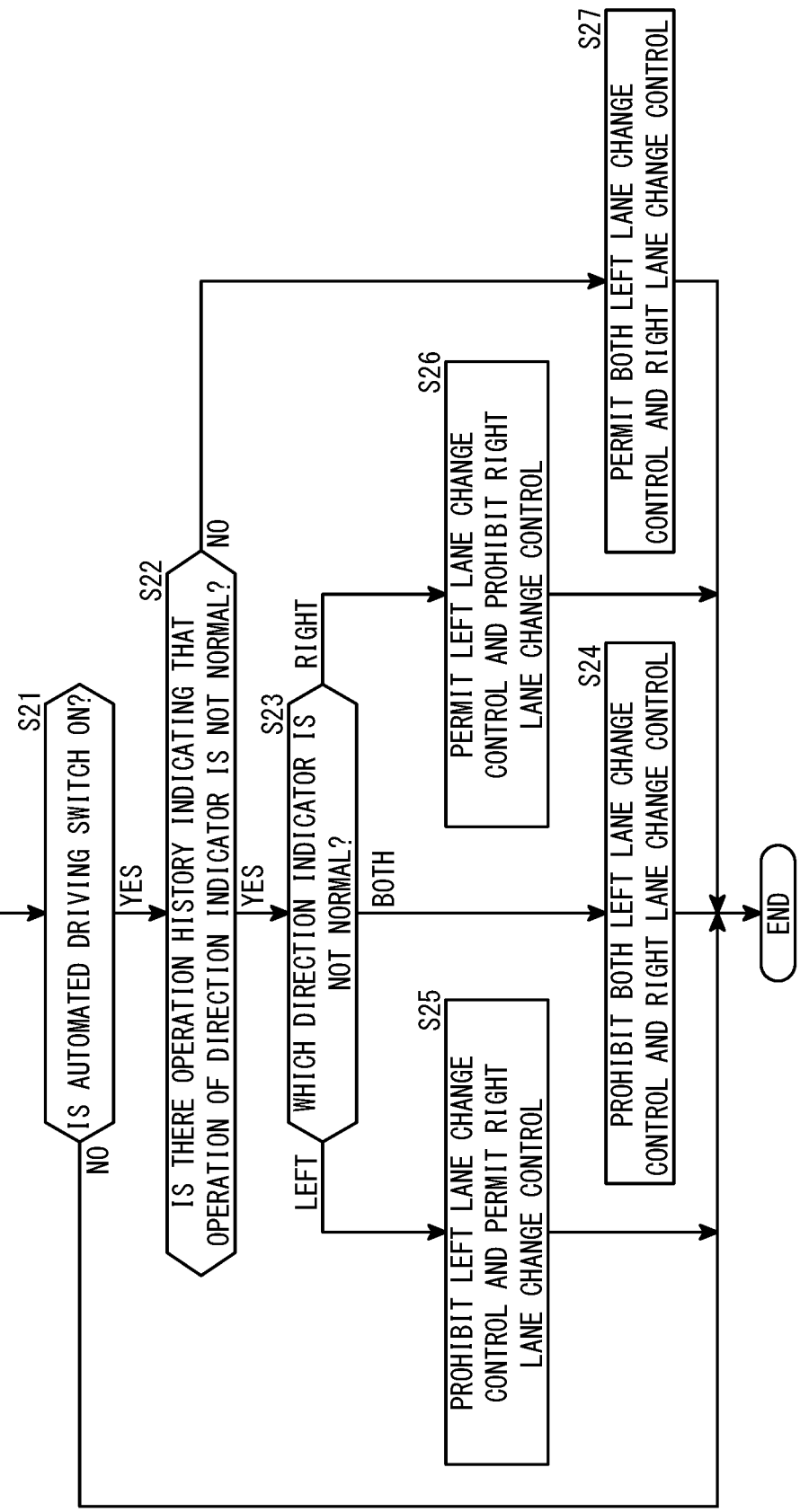
FIG. 3 is a flowchart illustrating a lane change control suppressing process to be performed in the vehicle control unit.

FIG. 3 is a flowchart illustrating a lane change control suppressing process to be performed in the vehicle control unit 12 according to the present embodiment. The lane change control suppressing process is performed on a predetermined cycle in a state where the vehicle 10 is in operation.

In step S21, the lane change control suppression unit 20 determines whether the automated driving switch 64 is on. If the automated driving switch 64 is on, the process advances to step S22 and if the automated driving switch 64 is off, the lane change control suppressing process ends.

In step S22, the lane change control suppression unit 20 determines whether the operation history storage unit 18 stores the operation history indicating that the operation of the direction indicator 80 is not normal. If the operation history storage unit 18 stores the operation history indicating that the operation of the direction indicator 80 is not normal, the process advances to step S23 and if the operation history storage unit 18 does not store the operation history indicating that the operation of the direction indicator 80 is not normal, the process advances to step S27.

In step S23, the lane change control suppression unit 20 determines the direction indicator 80 whose operation is not normal from the operation history stored in the operation history storage unit 18. If the direction indicator 80 whose operation is not normal is both the left and right direction indicators 80, the process advances to step S24. If the direction indicator 80 whose operation is not normal is the left direction indicator 80, the process advances to step S25 and if it is the right direction indicator 80, the process advances to step S26.

In step S24, the lane change control suppression unit 20 prohibits both the left lane change control and the right lane change control (control for changing to the left or right lane) and then, the lane change control suppressing process ends. Prohibiting the lane change control means not allowing the lane change control unit 16 to perform the lane change control.

In step S25, the lane change control suppression unit 20 prohibits the left lane change control (control for changing to the left lane) and permits the right lane change control (control for changing to the right lane), and then the lane change control suppressing process ends. Permitting the lane change control means allowing the lane change control unit 16 to perform the lane change control.

In step S26, the lane change control suppression unit 20 permits the left lane change control and prohibits the right lane change control, and then the lane change control suppressing process ends.

In step S27, the lane change control suppression unit 20 permits both the left lane change control and the right lane change control, and then the lane change control suppressing process ends.

[Lane Change Control Process]

Figure 4:
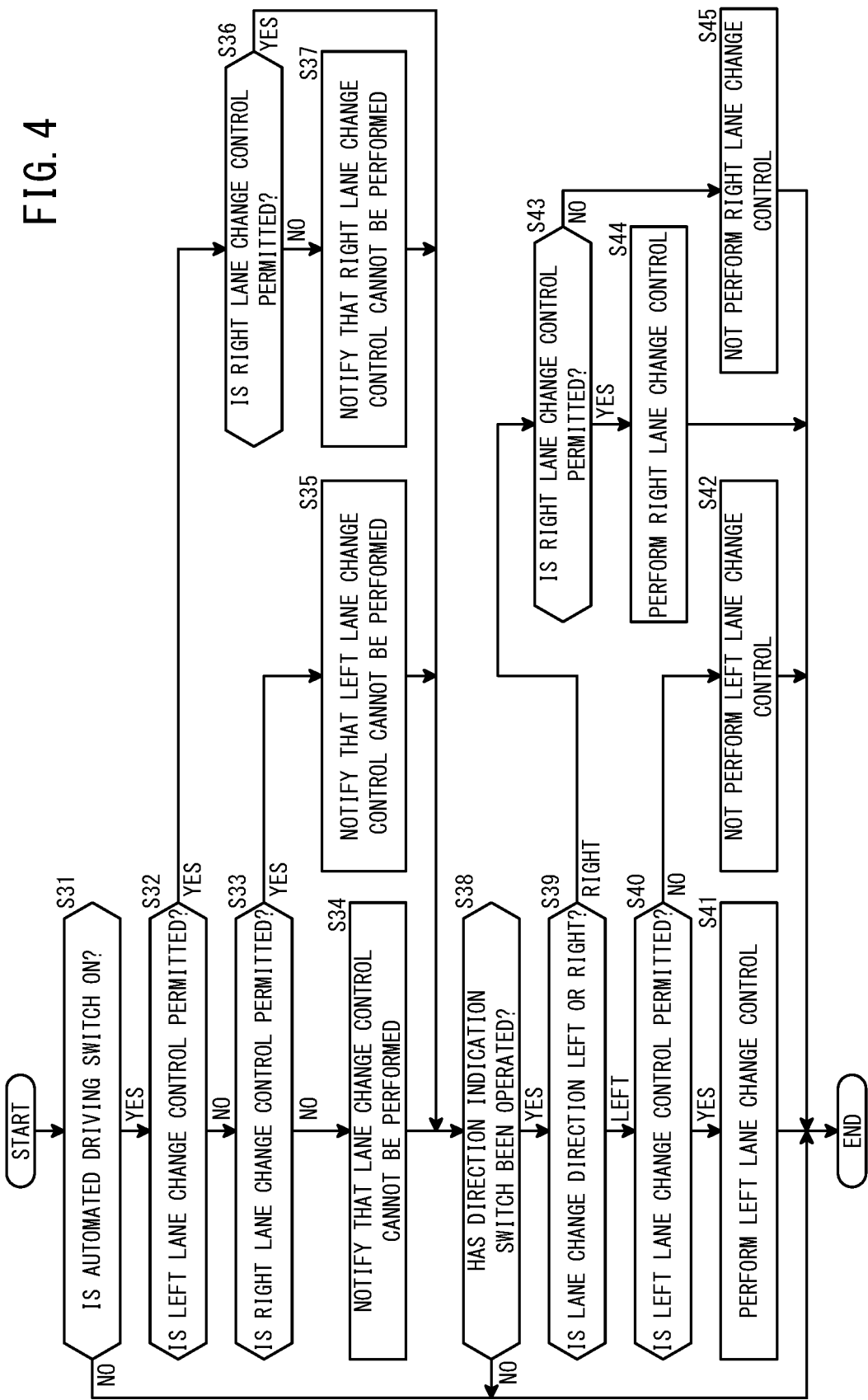
FIG. 4 is a flowchart illustrating a lane change control process to be performed in the vehicle control unit.

FIG. 4 is a flowchart illustrating a lane change control process to be performed in the vehicle control unit 12 according to the present embodiment. The lane change control process is performed on a predetermined cycle in the state where the vehicle 10 is in operation.

In step S31, the lane change control unit 16 determines whether the automated driving switch 64 is on. If the automated driving switch 64 is on, the process advances to step S32 and if the automated driving switch 64 is off, the lane change control process ends.

In step S32, the lane change control unit 16 determines whether the left lane change control is permitted. If the left lane change control is permitted, the process advances to step S36, and if the left lane change control is not permitted, the process advances to step S33.

In step S33, the lane change control unit 16 determines whether the right lane change control is permitted. If the right lane change control is permitted, the process advances to step S35, and if the right lane change control is not permitted, the process advances to step S34.

In step S34, the lane change control unit 16 controls the display 92 so as to display a message or a sign notifying the user that the lane change control cannot be performed, and then the process advances to step S38.

In step S35, the lane change control unit 16 controls the display 92 so as to display the message or the sign notifying the user that the left lane change control cannot be performed, and then the process advances to step S38.

In step S36, the lane change control unit 16 determines whether the right lane change control is permitted. If the right lane change control is permitted, the process advances to step S38, and if the right lane change control is not permitted, the process advances to step S37.

In step S37, the lane change control unit 16 controls the display 92 so as to display the message or the sign notifying the user that the right lane change control cannot be performed, and then the process advances to step S38.

Note that the processes in step S34, step S35, and step S37 may be replaced by a process in which the lane change control unit 16 controls the speaker 90 so as to output the message notifying the user that the lane change control cannot be performed. In addition, the processes in step S34, step S35, and step S37 may be replaced by a process in which the lane change control unit 16 controls a side mirror (not shown) of the vehicle 10 so as to display the sign notifying the user that the lane change control cannot be performed. Moreover, the processes in step S34, step S35, and step S37 may be replaced by a process in which the lane change control unit 16 controls a head-up display (HUD, not shown) so as to display the message or the sign notifying the user that the lane change control cannot be performed on a windshield (not shown) of the vehicle 10.

In step S38, the lane change control unit 16 determines whether the direction indication switch 66 has been operated. If the direction indication switch 66 has been operated, the process advances to step S39, and if the direction indication switch 66 has not been operated, the lane change control process ends.

In step S39, the lane change control unit 16 determines whether the lane change direction is left or right. If the lane change direction is left, the process advances to step S40 and if the lane change direction is right, the process advances to step S43. The lane change control unit 16 determines the lane change direction in accordance with the direction to which the user has operated the direction indication switch 66.

In step S40, the lane change control unit 16 determines whether the left lane change control is permitted. If the left lane change control is permitted, the process advances to step S41 and if the left lane change control is not permitted, the process advances to step S42.

In step S41, the lane change control unit 16 performs the left lane change control on the basis of the surrounding situation of the host vehicle 10 acquired by the surrounding situation acquisition unit 14, and then the lane change control process ends.

In step S42, the lane change control unit 16 ends the lane change control process without performing the left lane change control.

In step S43, the lane change control unit 16 determines whether the right lane change control is permitted. If the right lane change control is permitted, the process advances to step S44 and if the right lane change control is not permitted, the process advances to step S45.

In step S44, the lane change control unit 16 performs the right lane change control on the basis of the surrounding situation of the host vehicle 10 acquired by the surrounding situation acquisition unit 14, and then the lane change control process ends.

In step S45, the lane change control unit 16 ends the lane change control process without performing the right lane change control.

[Operation Effect]

In the case where the operation of the direction indicator 80 is not normal, that is, the direction indicator 80 cannot blink, when the lane change control is performed, the host vehicle 10 may inadequately perform the lane change without blinking the direction indicator 80. In view of this, in the case where the operation of the direction indicator 80 is not normal, the lane change control is suppressed.

Figure 5:
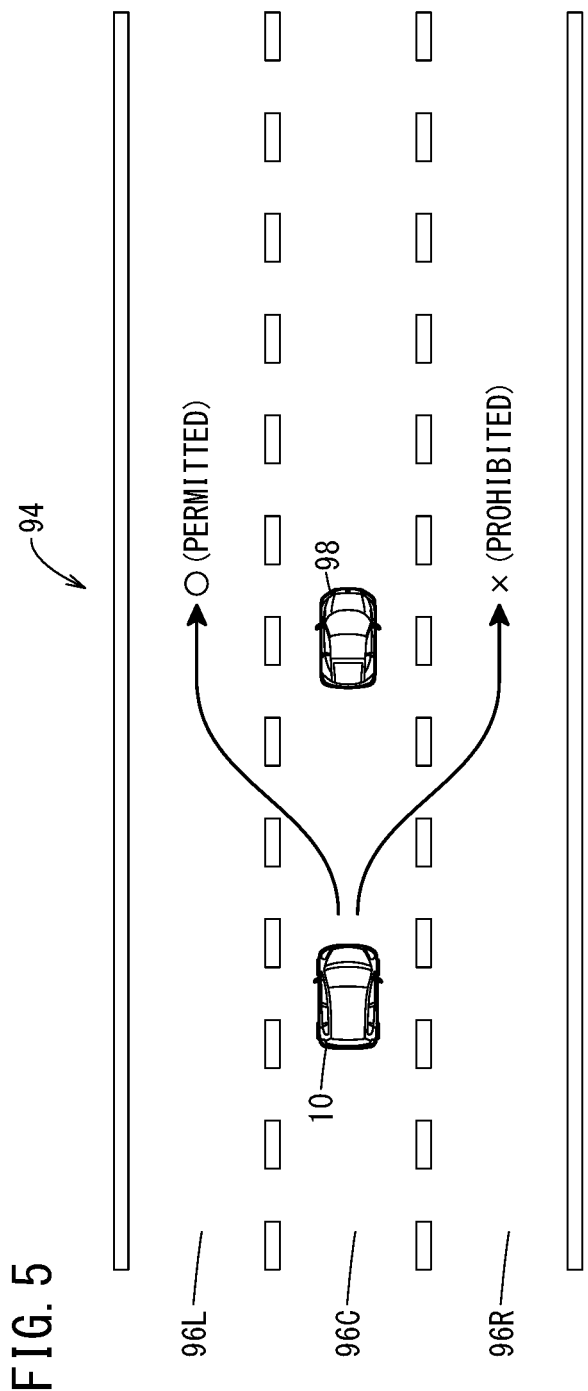
FIG. 5 is a diagram illustrating an example of a road where a host vehicle travels.

FIG. 5 is a diagram illustrating an example of a road 94 where the host vehicle 10 travels. In FIG. 5, the road 94 includes three travel lanes (a left lane 96L, a center lane 96C, and a right lane 96R). The host vehicle 10 travels in the center lane 96C and tries to perform the lane change control in order to avoid a preceding vehicle 98. Here, if the operation of the left direction indicator 80 is normal and the operation of the right direction indicator 80 is not normal on the basis of the operation history stored in the operation history storage unit 18, the lane change control suppression unit 20 permits the lane change control to the left lane 96L but does not permit the lane change control to the right lane 96R. Therefore, in the case where the user has operated the direction indication switch 66 to the left in order to perform the lane change control, the lane change control unit 16 performs the lane change control but in the case where the user has operated the direction indication switch 66 to the right, the lane change control unit 16 does not perform the lane change control.

Incidentally, the determination as to whether the operation of the direction indicator 80 is normal can be performed only when the direction indicator 80 is operated. Therefore, when the user has operated the direction indication switch 66 in order to perform the lane change control, it may be determined that the operation of the direction indicator 80 is not normal and the lane change control may be suppressed. That is to say, the user recognizes that the lane change control is suppressed after trying to perform the lane change control; thus, the user may feel unsatisfied.

In view of the above circumstance, the vehicle control unit 12 according to the present embodiment stores, in the operation history storage unit 18, the operation history indicating that the operation of the direction indicator 80 is normal or not normal when the direction indicator 80 is operated. Then, in the vehicle control unit 12, the lane change control suppression unit 20 allows the lane change control unit 16 to perform the lane change control in the case where the operation history storage unit 18 does not store the operation history indicating that the operation of the direction indicator 80 is not normal, and the lane change control suppression unit 20 suppresses the lane change control performed by the lane change control unit 16 in the case where the operation history storage unit 18 stores the operation history indicating that the operation of the direction indicator 80 is not normal.

When the automated driving switch 64 is off, that is, before the user operates the direction indication switch 66 in order to perform the lane change control, the operation history storage unit 18 can store the operation history indicating the operation state of the direction indicator 80 when the user operated the direction indication switch 66, the hazard switch 67, or the lock/unlock switch 68. Thus, the user can be notified that the lane change control is suppressed before the user tries to perform the lane change control.

In the case where the operation history storage unit 18 stores the operation history indicating that the operation of the direction indicator 80 is not normal, the lane change control performed by the lane change control unit 16 can be suppressed. Thus, the host vehicle 10 does not perform the lane change without blinking the direction indicator 80 and accordingly, the host vehicle 10 can travel more safely.

Furthermore, the vehicle control unit 12 according to the present embodiment stores, in the operation history storage unit 18, the operation history indicating that the operation of the direction indicator 80 is normal or not normal in the case where the direction indicator 80 has been operated on the basis of the user's operation for the host vehicle 10. Thus, when the user has operated the direction indication switch 66, the hazard switch 67, or the lock/unlock switch 68, the operation history is stored in the operation history storage unit 18. Therefore, before the user tries to start the lane change control by operating the direction indicator 80, the user can be notified that the lane change control cannot be performed.

In addition, in the case where the operation history indicating that the operation of one of the left and right direction indicators 80 is not normal is present, the vehicle control unit 12 according to the present embodiment causes the lane change control suppression unit 20 to prohibit only one lane change control. Thus, in the case where the operation of the other of the left and right direction indicators 80 is normal, the other lane change control can be performed and thus the lane change control can be performed more often.

Note that in the case where there is an operation history indicating that the operation of one of the left and right direction indicators 80 is not normal, the lane change control suppression unit 20 of the vehicle control unit 12 according to the present embodiment may prohibit the lane change control for both lanes, i.e., the left and right lanes. In the case where the operation of one of the left and right direction indicators 80 is not normal, it is predicted that the other direction indicator 80 is not normal either. In addition, it is predicted that the vehicle 10 having shifted to one of the left and right sides will change lanes to the other. Thus, the host vehicle 10 does not perform the lane change without blinking the direction indicator 80, and accordingly, the host vehicle 10 can travel more safely.

Second Embodiment

Figure 6:
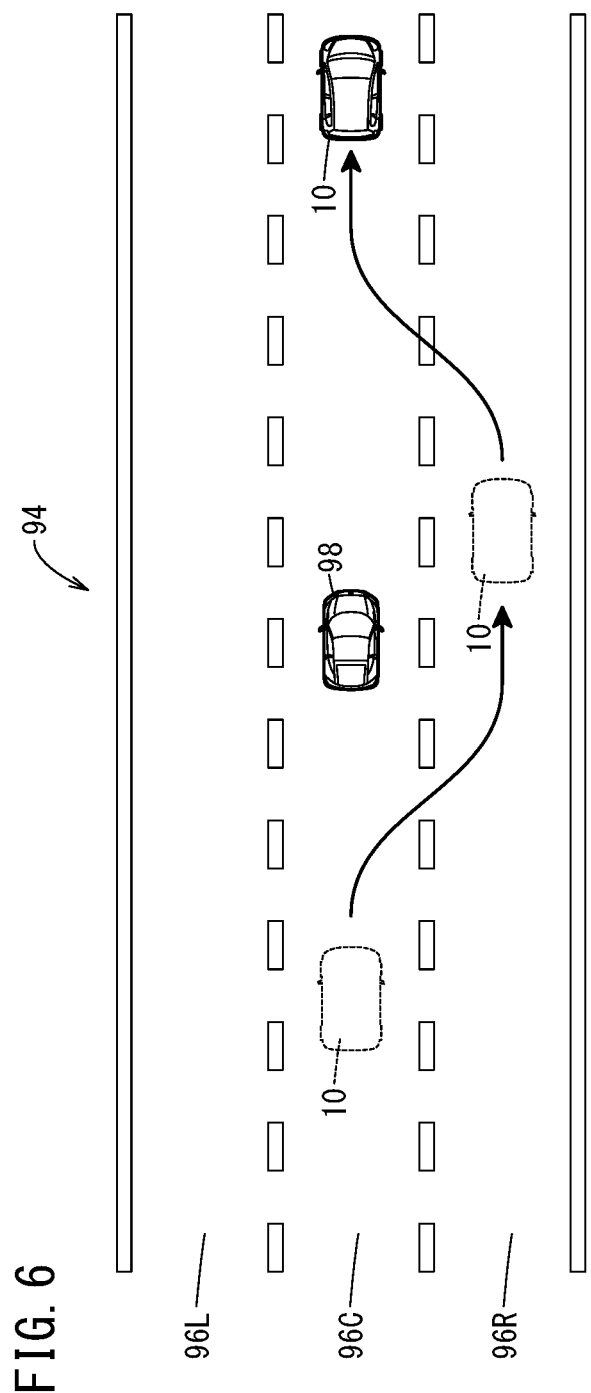
FIG. 6 is a diagram for describing overtaking control to be performed in the vehicle control unit.

FIG. 6 is a diagram for describing overtaking control to be performed in the vehicle control unit 12 according to the present embodiment. The vehicle control unit 12 according to the present embodiment causes the lane change control unit 16 to perform the overtaking control. The overtaking control is performed when the host vehicle 10 traveling in the center lane 96C overtakes the preceding vehicle 98 that travels in the center lane 96C as illustrated in FIG. 6; specifically, the overtaking control causes the host vehicle 10 to shift to the right lane 96R, which is adjacent to the center lane 96C, and then shift to the center lane 96C ahead of the preceding vehicle 98. In the overtaking control, the host vehicle 10 shifts to the lane in the direction designated by the user's operation for the direction indication switch 66 before the host vehicle 10 overtakes the preceding vehicle 98; however, after the host vehicle 10 overtakes the preceding vehicle 98, the host vehicle 10 returns to the original lane without the user's operation for the direction indication switch 66. The overtaking control is one example of the lane change control.

In the present embodiment, an overtaking control process to be described below is performed, instead of the lane change control process performed in the lane change control unit 16 according to the first embodiment.

[Overtaking Control Process]

Figure 7:
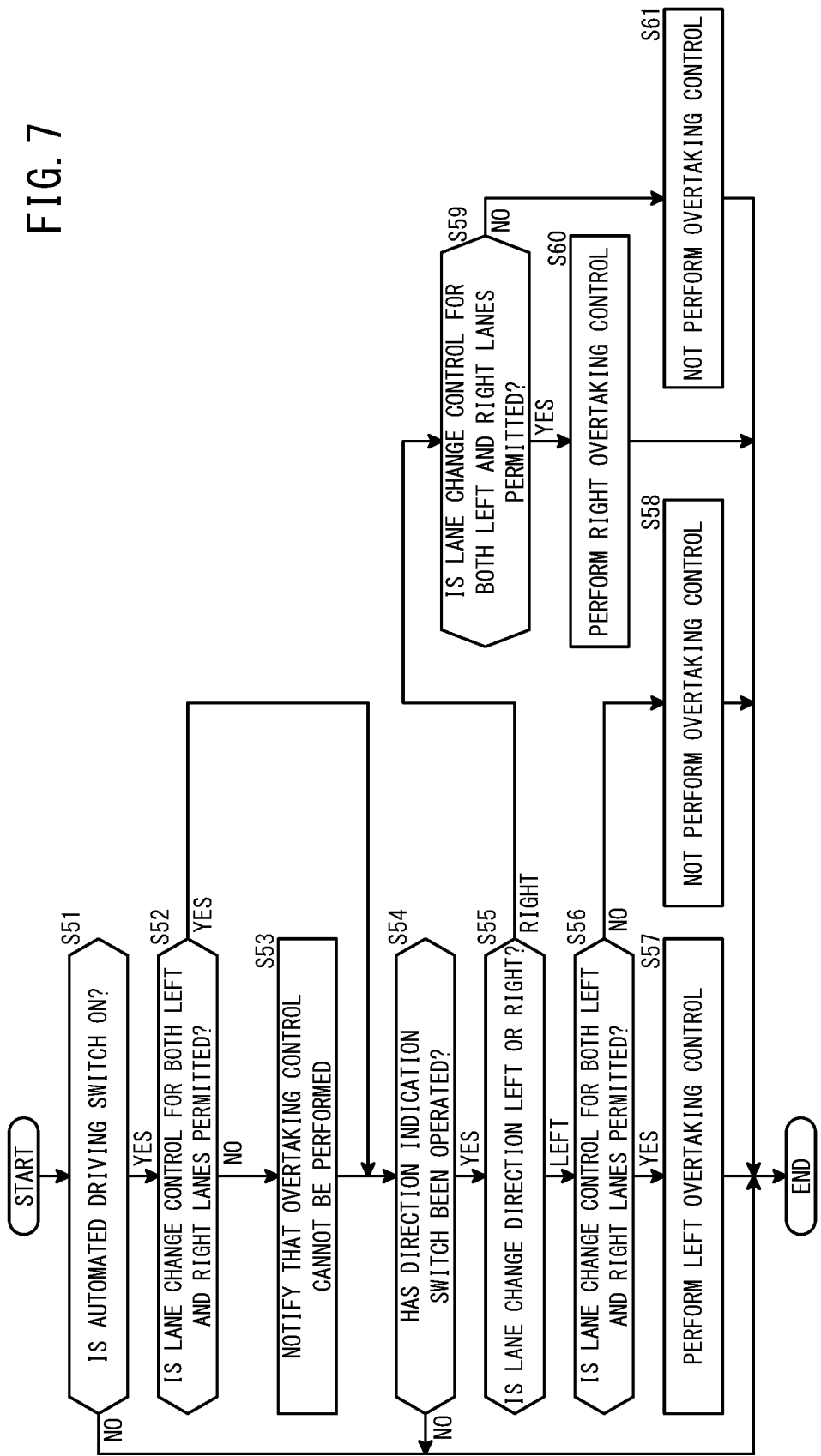
FIG. 7 is a flowchart illustrating an overtaking control process to be performed in the vehicle control unit.

FIG. 7 is a flowchart illustrating the overtaking control process to be performed in the vehicle control unit 12 according to the present embodiment. The overtaking control process is performed on a predetermined cycle in the state where the vehicle 10 is in operation.

In step S51, the lane change control unit 16 determines whether the automated driving switch 64 is on. If the automated driving switch 64 is on, the process advances to step S52, and if the automated driving switch 64 is off, the overtaking control process ends.

In step S52, the lane change control unit 16 determines whether the lane change control for both the left and right lanes is permitted. If the lane change control for both the left and right lanes is permitted, the process advances to step S54, and if the lane change control is not permitted for either the left lane or the right lane, the process advances to step S53.

In step S53, the lane change control unit 16 controls the display 92 so as to display the message or the sign notifying the user that the overtaking control cannot be performed, and then the process advances to step S54.

Note that the process in step S53 may be replaced by a process in which the lane change control unit 16 controls the speaker 90 so as to output the message notifying the user that the overtaking control cannot be performed. In addition, the process in step S53 may be replaced by a process in which the lane change control unit 16 controls the side mirror (not shown) of the vehicle 10 so as to display the sign notifying the user that the overtaking control cannot be performed. Moreover, the process in step S53 may be replaced by a process in which the lane change control unit 16 controls the head-up display (HUD, not shown) so as to display the message or the sign notifying the user that the overtaking control cannot be performed on the windshield (not shown) of the vehicle 10.

In step S54, the lane change control unit 16 determines whether the direction indication switch 66 has been operated. If the direction indication switch 66 has been operated, the process advances to step S55, and if the direction indication switch 66 has not been operated, the overtaking control process ends.

In step S55, the lane change control unit 16 determines whether the lane change direction is left or right. If the lane change direction is left, the process advances to step S56 and if the lane change direction is right, the process advances to step S59. The lane change control unit 16 determines the lane change direction in accordance with the direction to which the user has operated the direction indication switch 66.

In step S56, the lane change control unit 16 determines whether the lane change control for both the left and right lanes is permitted. If the lane change control for both the left and right lanes is permitted, the process advances to step S57 and if the lane change control is not permitted for either the left lane or the right lane, the process advances to step S58.

In step S57, the lane change control unit 16 performs the left overtaking control on the basis of the surrounding situation of the host vehicle 10 acquired by the surrounding situation acquisition unit 14, and then the overtaking control process ends. Note that the left overtaking control corresponds to the control that causes the host vehicle 10 to shift to the left lane, overtake the preceding vehicle 98, and then return to the original lane.

In step S58, the lane change control unit 16 ends the overtaking control process without performing the overtaking control.

In step S59, the lane change control unit 16 determines whether the lane change control for both the left and right lanes is permitted. If the lane change control for both the left and right lanes is permitted, the process advances to step S60 and if the lane change control is not permitted for either the left lane or the right lane, the process advances to step S61.

In step S60, the lane change control unit 16 performs the right overtaking control on the basis of the surrounding situation of the host vehicle 10 acquired by the surrounding situation acquisition unit 14, and then the overtaking control process ends. Note that the right overtaking control corresponds to the control that causes the host vehicle 10 to shift to the right lane, overtake the preceding vehicle 98, and then return to the original lane.

In step S61, the lane change control unit 16 ends the overtaking control process without performing the overtaking control.

[Operation Effect]

In the overtaking control, both the left lane change and the right lane change are performed for the host vehicle 10. Therefore, in the case where the operation history storage unit 18 stores the operation history indicating that the operation of one of the left and right direction indicators 80 is not normal, the vehicle control unit 12 according to the present embodiment suppresses the overtaking control. Thus, the host vehicle 10 does not change lanes without blinking the direction indicator 80; accordingly, the host vehicle 10 can travel more safely.

[Technical Concept Obtained from Embodiments]

The technical concept that is obtained from the above embodiments is hereinafter described.

The vehicle control unit (12) includes: the surrounding situation acquisition unit (14) configured to acquire the surrounding situation of the host vehicle (10); the lane change control unit (16) configured to perform the lane change control in which the host vehicle changes lanes on the basis of the surrounding situation; and the lane change control suppression unit (20) configured to allow the lane change control in the case where there is no operation history indicating that the operation of the notification unit (80) configured to notify the direction to which the traveling direction of the host vehicle is changed is not normal, and suppress the lane change control in the case where the operation history indicating that the operation of the notification unit is not normal is present. Thus, the host vehicle does not perform the lane change in the state where the notification unit cannot perform the normal operation and accordingly, the host vehicle can travel more safely.

The aforementioned vehicle control unit may further include the operation history storage unit (18) configured to store the operation history indicating that the operation of the notification unit is normal or not normal when the notification unit is operated, wherein the operation history storage unit may be configured to store the operation history indicating that the operation of the notification unit is normal or not normal in the case where the notification unit is operated by the operation of the user of the host vehicle. Thus, before the user starts the lane change control, the operation history storage unit can store the operation history indicating that the operation of the notification unit is normal or not normal.

In the aforementioned vehicle control unit, the notification unit may be configured to notify the first direction and the second direction that is opposite to the first direction as the directions to which the traveling direction of the host vehicle is changed, the operation history storage unit may be configured to store the operation history indicating that the operation of the notification unit for notifying the first direction is normal or not normal and the operation of the notification unit for notifying the second direction is normal or not normal, and the lane change control suppression unit may be configured to, in the case where the operation history indicating that the operation of the notification unit for notifying one of the first direction and the second direction is not normal is present, suppress the lane change control to the one direction. Thus, in the case where only the operation of the notification unit for notifying one of the first direction and the second direction is not normal, the lane change control to the other direction can be performed, and thus, the lane change control can be performed more often.

In the aforementioned vehicle control unit, the notification unit may be configured to notify the first direction and the second direction that is opposite to the first direction as the directions to which the traveling direction of the host vehicle is changed, the operation history storage unit may be configured to store the operation history indicating that the operation of the notification unit for notifying the first direction is normal or not normal and the operation of the notification unit for notifying the second direction is normal or not normal, and the lane change control suppression unit may be configured to, in the case where the operation history indicating that the operation of the notification unit for notifying one of the first direction and the second direction is not normal is present, suppress the lane change control to both the first direction and the second direction. Thus, the host vehicle does not perform the lane change in the state where the notification unit cannot perform the normal operation and accordingly, the host vehicle can travel more safely.

In the aforementioned vehicle control unit, the lane change control unit may be configured to perform, as the lane change control, the overtaking control in which the host vehicle traveling in the first lane shifts to the second lane adjacent to the first lane in order to overtake the preceding vehicle (98) traveling in the first lane, and then shifts to the first lane at the position ahead of the preceding vehicle, the notification unit may be configured to notify the first direction and the second direction that is opposite to the first direction as the directions to which the traveling direction of the host vehicle is changed, the operation history storage unit may be configured to store the operation history indicating that the operation of the notification unit for notifying the first direction is normal or not normal and the operation of the notification unit for notifying the second direction is normal or not normal, and the lane change control suppression unit may be configured to suppress the overtaking control in the case where the operation history indicating that the operation of the notification unit for notifying one of the first direction and the second direction is not normal is present. Thus, the host vehicle does not perform the lane change in the state where the notification unit cannot perform the normal operation and accordingly, the host vehicle can travel more safely.

The vehicle control unit includes: the surrounding situation acquisition unit (14) configured to acquire the surrounding situation of the host vehicle (10); the lane change control unit (16) configured to perform the lane change control in which the host vehicle changes lanes on the basis of the surrounding situation; and the lane change control suppression unit (20) configured to allow the lane change control in the case where there is no operation history indicating that the operation of the notification unit (80) configured to notify the direction to which the traveling direction of the host vehicle is changed is abnormal, and suppress the lane change control in the case where the operation history indicating that the operation of the notification unit is abnormal is present. Thus, the host vehicle does not perform the lane change in the state where the notification unit cannot perform the normal operation and accordingly, the host vehicle can travel more safely.

The vehicle (10) includes the aforementioned vehicle control unit. Thus, the host vehicle does not perform the lane change in the state where the notification unit cannot perform the normal operation and accordingly, the host vehicle can travel more safely.

The vehicle control method includes: the lane change control suppressing step of allowing the lane change control in the case where there is no operation history indicating that the operation of the notification unit (80) configured to notify the direction to which the traveling direction of the host vehicle (10) is changed is not normal, and suppressing the lane change control in the case where the operation history indicating that the operation of the notification unit is not normal is present; the surrounding situation monitoring step of monitoring the surrounding situation of the host vehicle; and the lane change controlling step of performing the lane change control in which the host vehicle change lanes on the basis of the surrounding situation. Thus, the host vehicle does not perform the lane change in the state where the notification unit cannot perform the normal operation and accordingly, the host vehicle can travel more safely.

The present invention is not particularly limited to the embodiment described above, and various modifications are possible without departing from the gist of the present

What is claimed is:

1. A vehicle control unit comprising:
one or more processors that:
acquire sensor data indicative of a surrounding situation of a host vehicle;
perform lane change control in which the host vehicle changes lanes on a basis of the surrounding situation;
store in a memory at a time in which a direction indicator is operated by an operation of a user of the host vehicle, as an operation history, one of normal operation and not normal operation of a direction indicator in providing notification of a first direction or a second direction, as a direction to which a traveling direction of the host vehicle will be changed, the second direction being opposite to the first direction; and
suppress the lane change control to the first direction and allow the lane change control to the second direction in a case where the operation history indicative of not normal operation in providing the notification of the first direction and normal operation in providing the notification of the second direction is stored, and
suppress the lane change control to the first direction and the second direction in a case where the operation history indicative of not normal operation in providing the notification of the first direction and the second direction is stored.

2. A vehicle control method comprising:
a surrounding situation monitoring step of monitoring a surrounding situation of a host vehicle;
an operation history storing step of storing in a memory at a time in which a direction indicator is operated by an operation of a user of the host vehicle, as an operation history, one of normal operation and not normal operation of a direction indicator in providing notification of a first direction or a second direction, as a direction to which a traveling direction of the host vehicle will be changed, the second direction being opposite to the first direction; and
a lane change controlling step of performing the lane change control in which the host vehicle change lanes on the basis of the surrounding situation;
wherein the lane change controlling step further includes:
a lane change control allowing step of allowing the lane change control to the first direction and the second direction in a case that the operation history indicative of normal operation in providing the notification of the first direction and the second direction is stored,
a first lane change control suppressing step of suppressing the lane change control to the first direction and allowing the lane change control to the second direction in a case where the operation history indicative of not normal operation in providing the notification of the first direction and normal operation in providing the notification of the second direction is stored, and
a second lane change control suppressing step of suppressing the lane change control to the first direction and the second direction in a case where the operation history indicative of not normal operation in providing the notification of the first direction and the second direction is stored.

* * * * *